United States Patent [19]

Scanlon et al.

[11] Patent Number: 5,164,919

[45] Date of Patent: Nov. 17, 1992

[54] FLUIDIC SONAR SENSOR

[75] Inventors: Michael Scanlon, Springfield, Va.; Stephen M. Tenney, Rockville, Md.; Nassy Srour, Silver Spring, Md.; James W. Joyce, Rockville, Md.

[73] Assignee: United States of America as represented by the Secretary of the Army, Washington, D.C.

[21] Appl. No.: 802,796

[22] Filed: Dec. 6, 1991

[51] Int. Cl.⁵ .............................. H04R 15/00
[52] U.S. Cl. ..................... 367/135; 367/178; 367/901
[58] Field of Search ............ 367/135, 178, 901; 181/177; 381/57, 165

[56] References Cited

U.S. PATENT DOCUMENTS

| | | | |
|---|---|---|---|
| 4,102,075 | 7/1978 | Wagner et al. | 43/17.1 |
| 4,964,100 | 10/1990 | Srour et al. | 367/178 |
| 4,970,704 | 11/1990 | Kelly | 367/142 |

OTHER PUBLICATIONS

Joyce, J. W., "Design Guide for Fluidic Laminar Proportional Amplifiers and Laminar Jet Angular Rate Sensor," Harry Diamond Laboratories, HDL-SR-84-6 (1984).

*Primary Examiner*—Daniel T. Pihulic
*Attorney, Agent, or Firm*—Saul Elbaum; Jason M. Shapiro

[57] ABSTRACT

A sonar sensor comprising a substantially non-corrodible housing and a fluidic gainblock disposed therein. In addition, one or more fluid-filled laminar proportional amplifiers are arranged either in series or in parallel and contained within the fluidic gainblock. Means are provided to produce a jet within each laminar proportional amplifier, which is then modulated by incoming acoustic signals. The pressure caused by diverting the jet from its equilibrium path is proportional to, but greater than, the incoming acoustic signal. Hydrophones are used to convert the amplified acoustic signal into an electrical signal. In one embodiment, the fluidic gainblock is free-flooded and open to the liquid environment in which it is used, obviating the need for pressure equalization. In another embodiment, the fluidic gainblock is provided with filtering means for prevent the accumulation of sediment within the cavities making up the laminar proportional amplifiers. In yet another embodiment, the fluidic gainblock is a closed-system which recirculates its fluid supply, increasing the sensor's operating life and isolating the laminar proportional amplifiers therein.

19 Claims, 1 Drawing Sheet

FLUIDIC SONAR SENSOR

GOVERNMENTAL INTEREST

The invention described herein may be manufactured, used and licensed by or for the U.S. Government for governmental purposes without the payment to us of any royalties thereon.

BACKGROUND OF THE INVENTION

The present invention relates to sonar devices generally, and more particularly, to a sonar listening device which amplifies acoustic signals non-electronically using fluidic technology.

Heretofore, most underwater listening devices have employed conventional piezoelectric, electrostrictive and magnetostrictive transducers. Some examples of piezoelectric materials are quartz, ammonium dihydrogen phosphate, and Rochelle salt. Electrostrictive materials include barium titanate and lead zirconate titanate. Both piezoelectric and electrostrictive materials develop an electrical charge when placed under pressure. Magnetostrictive materials alter the magnetic field which surrounds them when under pressure. These properties have been obtained using various ceramic materials which are easily molded into useful shapes. For this reason, it is very common for hydrophones to employ ceramic transducers. Other types of transducers useful in sonar applications include fiber optic hydrophones and thin-film polymers.

Generally, these types of hydrophones require some type of mechanical deformation in order to produce a useable electrical (or optical) signal. This, in turn, limits their sensitivity. The typically weak signals which are generated must be electronically amplified and filtered before they can be analyzed, and the equipment necessary to accomplish these tasks is both expensive, bulky, and delicate. Furthermore, in the case of low frequency signals, large apertures or diaphragms are necessary, thereby causing increased drag and flow-noise when in use.

Typical configurations for sonar sensors include the sono-buoy, the conformal array, permanently placed sensors such as SOSUS, and dipped or towed sonar. In any configuration it is desirable that the sonar listening device be sensitive, quiet, inexpensive, yet dependable. In the case of dipping sonar in particular, it is necessary that the sonar equipment be compact, as it must fit within a helicopter prior to deployment.

SUMMARY OF THE INVENTION

Accordingly, it is an object of the present invention to provide a sonar listening device which is extremely sensitive, rugged, compact, and inexpensive, so that it may be used effectively in sono-buoys, and conformal, towed, or dipped arrays.

It is another object of the present invention to provide a sonar listening device which amplifies low amplitude acoustic signals without sophisticated electronics, and is therefore substantially insensitive to electromagnetic pulses and interference.

It is yet another object of the present invention to provide a sonar listening device which detects low frequency acoustic signals without the use of large diaphragms or apertures.

It is still another object of the present invention to improve the performance of existing sonar systems by amplifying acoustic signals non-electronically prior to detection by conventional transducers.

It is another object of the present invention to provide a sonar listening device that is substantially or completely non-electronic, with essentially no internal noise, thus having greater sensitivity than a comparable all-electronic device.

These objects and others not specifically enumerated are accomplished with a sonar sensor comprising a substantially non-corrodible housing and a fluidic gainblock disposed therein. In addition, one or more fluid-filled laminar proportional amplifiers are arranged either in series or in parallel and contained within the fluidic gainblock. Means are provided to produce a jet within each laminar proportional amplifier, which is then able to be modulated by incoming acoustic signals. The pressure caused by diverting the jet from its equilibrium path is proportional to, but greater than, the incoming acoustic signal. Hydrophones are used to convert these proportional pressure changes into an electrical signal.

In one embodiment of the present invention, the fluidic gainblock is free-flooded and open to the liquid environment in which it is used. This obviates the need for pressure equalization within the laminar proportional amplifiers.

In another embodiment thereof, the fluidic gainblock is provided with filtering means to prevent the accumulation of sediment within the cavities making up the laminar proportional amplifiers.

In yet another embodiment of the present invention, the fluidic gainblock is a closed-system which recirculates its fluid supply. This increases the sensor's operating life and isolates the laminar proportional amplifiers from all but the acoustic signal of interest.

BRIEF DESCRIPTION OF THE DRAWINGS

The preferred embodiments of the present invention will be described with reference to the accompanying drawings.

DESCRIPTION OF THE PREFERRED EMBODIMENTS

Figure 1:
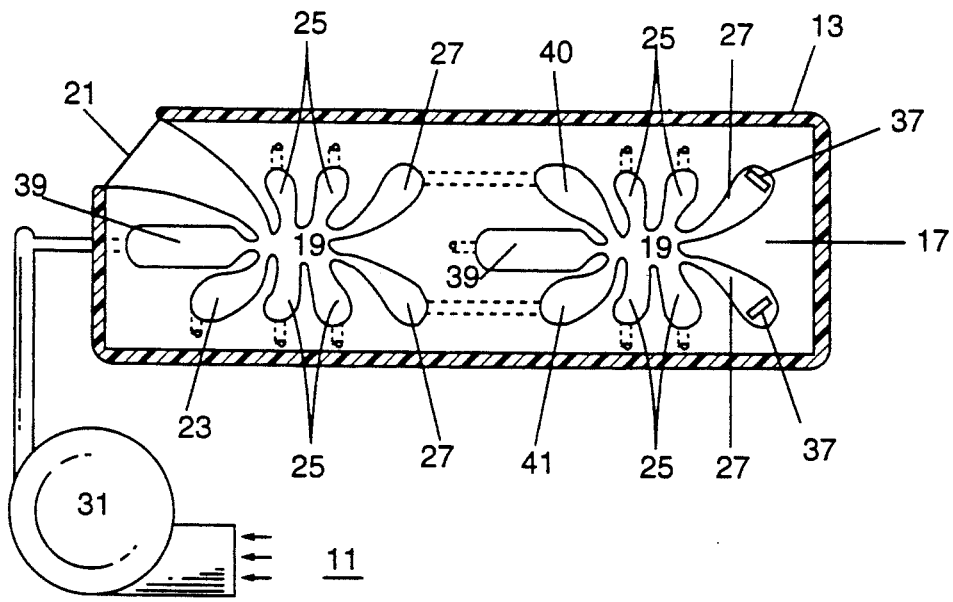
FIG. 1 is a schematic depiction of a flow-through fluidic sonar sensor.

Referring to FIG. 1, a fluidic sonar sensor is shown immersed in a liquid environment 11. The sensor depicted is known as an open, or flow-through, system since the working fluid is provided by the liquid environment 11. Practically speaking, such a system may not be useful in liquid environments heavily laden with sediment or other particles, such as seawater. As will become evident, the various parts of the fluidic gainblock 17 may become clogged with time, and require cleaning or replacement. However, the flow-through system inherently provides for hydrostatic pressure equalization, and as such represents the simplest embodiment of the fluidic sonar sensor. In addition, any inconvenience associated with routine cleaning of the component parts may be offset by the system's extreme sensitivity, durability, and economy.

In one mode of operation, a pump 31 collects liquid from the surrounding environment 11 and sets up a jet in one or more laminar proportional amplifiers 19 contained within a fluidic gainblock 17. Sound waves enter the fluidic gainblock 17 through an input port 21 which is unencumbered by mechanical diaphragms and the like. The deflection of the jet or jets caused thereby is sensed by conventional hydrophones or transducers 37 and converted into electrical signals which may then be processed using conventional means.

The fluidic gainblock 17 is preferably formed from a stack of patterned wafers, or laminates, approximately one and a third inches on each side, and between 0.004 and 0.025 inches thick. The patterns machined or formed therein define one or more laminar proportional amplifiers 19 operating alone or in stages (i.e. cascaded). It is desirable for the laminates to be constructed from a corrosion-resistant material, such as stainless steel or an epoxy resin. In the case of stainless steel, it is possible to fuse the laminates once assembled, thereby creating an essentially monolithic gainblock. Other materials, such as chemically-milled ceramics and fiber reinforced plastics, can be used to fabricate the laminates. The entire gainblock, in turn, may be encased or coated in rubber or urethane to further protect against corrosion. Rubber, and in particular neoprene rubber, may also serve as an anechoic coating. Of course, both the housing and the laminates may be constructed of other suitable materials, and the present invention is not meant to be limited to those materials specifically enumerated.

Laminar proportional amplifiers 19, in general, are distinguished by their ruggedness, remarkably flat frequency response, and exceptional gain. A typical laminar proportional amplifier 19 exhibits a gain of about 10, and a bandwidth of 0 to 4,000 Hz. In addition, sensitivities approaching −90 dB are possible in water. For these reasons laminar proportional amplifiers are well suited for sonar purposes.

Each laminar proportional amplifier 19 comprises a liquid-filled cavity having forward and aft ends. A liquid jet is introduced at the cavity's forward end (or plenum port 39) and allowed to travel the length of the cavity. Although FIG. 1 depicts a pump 31 as the means of collecting liquid 11 from the surrounding medium, in a towed array it is possible for the jet to be created by the movement of the sonar sensor itself through the liquid environment 11. In that case the plenum port 39 must be open, and Oriented in such a way as to continually collect liquid (i.e. submerged, and in the direction of travel). Two output ports 27 are arranged symmetrically about the center line of the cavity and made to extend backward diagonally from the cavity's aft end. In the absence of any transverse pressure gradients, the jet is split equally at the intersection of the two output ports 27. An input port 21 is disposed forward Of the two output ports 27 and on one side of the jet. It extends forward diagonally from the center line of the cavity and opens into the liquid environment 11 with or without a filter (not illustrated). A control port 23 is placed opposite the input port 21 and also made to extend forward diagonally. The control port 23 is maintained at approximately ambient pressure, and used as a null adjust to center the jet in the presence of mechanical imperfections. And while the input port 21 is purposefully exposed to any acoustic signal propagating in the liquid environment the control port 23 is isolated from such signals (e.g. through baffling, sound insulation). Venting ports are located forward of the output ports 27 and oriented substantially perpendicular to the center line of the cavity.

When an acoustic signal enters the input port 21 it creates a transverse pressure gradient across the jet, and causes the jet to deflect. As a result, a larger portion of the liquid jet is collected by one of the output ports 27, and the pressure therein increases. The difference in pressure between the two output ports 27 is greater than, but proportional to, the difference in pressure between the input port 21 and the control port 23. In the event of an underwater explosion, or other sudden high pressure signal, the jet is deflected towards one or more of the venting ports 25, thus protecting the output ports 27 and any sensitive equipment residing therein from damage.

The output ports 27 of one laminar proportional amplifier 19 may vent into the input ports 40, 41 of another laminar proportional amplifier to further increase the signal gain. Note that subsequent laminar proportional amplifiers make use of their control ports 41 as input ports (i.e. to amplify the differential signal). In the final stage of amplification, a hydrophone 37, or other transducer, is placed in each output port 27 to convert the acoustic signals into electrical signals. Suitable transducers include, but are not limited to, piezoelectric crystals such as tourmaline, and polymeric piezoelectric films. Of course, in some applications it may be desirable to monitor the amplified signals acoustically (for instance, in the event of a general power failure, or blackout), and in those instances a headset not unlike that employed with stethoscopes may be used.

Figure 2:
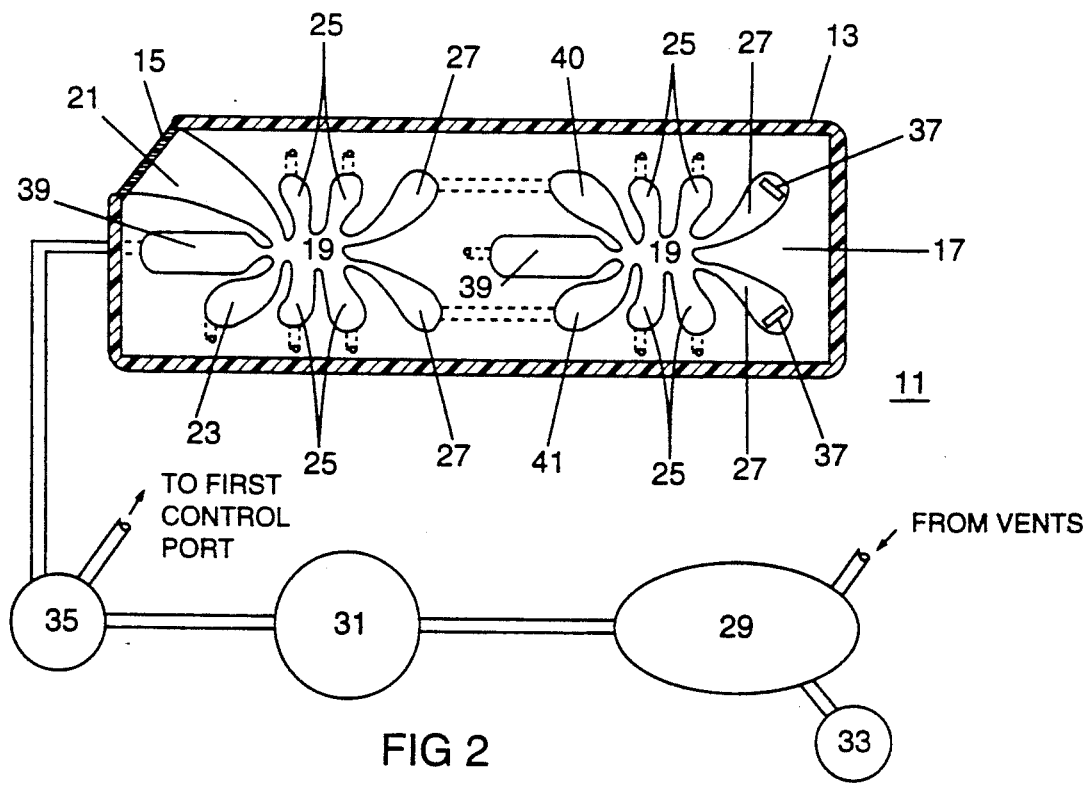
FIG. 2 is a schematic depiction of a self-contained fluidic sonar sensor.

Referring now to FIG. 2, another embodiment of the fluidic sonar sensor is shown immersed in a liquid environment 11. The sensor depicted is known as a closed, or self-contained, system since the working fluid is continually recirculated (i.e. not provided by the liquid environment 11). Such a system is useful in liquid environments heavily laden with sediment or other particles, such as seawater, where the various parts of the fluidic gainblock 17 may become clogged with time. However, the closed system must provide for hydrostatic pressure equalization. Like the flow-through sonar sensor, the closed system exhibits extreme sensitivity, durability, and economy.

In addition to those elements described in connection with the flow-through sonar sensor, the closed system is also provided with one or more acoustically transparent membranes (or diaphragms) 15, a reservoir 19 into which the venting ports 25 empty, and a pressure gage 33 and regulator 35 which maintain each laminar proportional amplifier 19 at ambient pressure (in the absence of both a jet or signal). These components allow the fluidic sonar sensor to be used in hostile environments for long periods without internal corrosion or sedimentary build-up, and at all depths.

In operation, a pump 31 circulates the liquid held in the reservoir 29, and sets up a jet in one or more laminar proportional amplifiers 19 contained within the fluidic gainblock 17. A pressure sensor 33 monitors the pressure within the vents 25 and/or control ports 23, and together with a pressure regulator 35, is used to maintain these cavities at or near the hydrostatic pressure of the surrounding environment 11. Sound waves impinge upon the membrane 15, which is preferably made of rubber (e.g. neoprene), and cause an acoustic signal to transfer to the fluid contained within the input port 21. The deflection of the jet or jets caused thereby is sensed by conventional hydrophones or transducers 37 and converted into electrical signals which may then be processed using conventional means.

While there has been described and illustrated specific embodiments of the invention, it will be obvious that various changes, modifications and additions can be made herein without departing from the field of the invention which should be limited only by the scope of the appended claims.

We claim:

1. A sensor for detecting acoustic signals in a liquid environment at variable depths, said sensor comprising:
   a substantially non-corrodible housing;
   a fluidic gainblock disposed within said housing to amplify said acoustic signal, said fluidic gainblock having at least one laminar proportional amplifier, wherein each laminar proportional amplifier is provided with an input port which is exposed to said acoustic signal, a control port which is maintained at approximately ambient pressure, one or more pairs of venting ports, and two output ports;
   means to create and maintain a liquid jet within each laminar proportional amplifier;
   one or more transducers disposed within said output ports to convert amplified acoustic signals into electrical signals.

2. The invention of claim 1 wherein said means to produce a liquid jet comprises one or more plenum ports and towing means.

3. The invention of claim 1 wherein said means to produce a liquid jet comprises a pump.

4. The invention of claim 1, 2, or 3 further comprising a plurality of cascading laminar proportional amplifiers wherein only the first of said laminar proportional amplifiers is provided with a control port maintained at approximately ambient pressure, and the output ports of said first laminar proportional amplifier feed into the input ports of subsequent laminar proportional amplifiers.

5. The invention of claim 1, 2, or 3 wherein said housing is comprised of neoprene rubber.

6. The invention of claim 4 wherein said housing is comprised of neoprene rubber.

7. The invention of claim 1, 2, or 3 wherein said input port which is exposed to said acoustic signal terminates in a filter.

8. The invention of claim 4 wherein said input port which is exposed to said acoustic signal terminates in a filter.

9. The invention of claim 5 wherein said input port which is exposed to said acoustic signal terminates in a filter.

10. The invention of claim 6 wherein said input port which is exposed to said acoustic signal terminates in a filter.

11. A sensor for detecting acoustic signals in a liquid environment at variable depths, said sensor comprising:
    a waterproof and substantially non-corrodible housing;
    one or more acoustically transparent membranes disposed upon the outside surface of said housing;
    a fluidic gainblock disposed within said housing to amplify said acoustic signal, said fluidic gainblock having at least one liquid-filled laminar proportional amplifier, wherein each laminar proportional amplifier is provided with an input port in communication with one or more of said transparent membranes, a control port which is maintained at approximately ambient pressure, one or more pairs of venting ports which empty into a reservoir, and two output ports;
    means to recirculate, and regulate the pressure of, said liquid within each laminar proportional amplifier, so that the internal pressure within the control port is substantially the same as the hydrostatic pressure of the liquid environment;
    one or more transducers disposed within said output ports to convert amplified acoustic signals into electrical signals.

12. The invention of claim 11 further comprising a plurality of cascading laminar proportional amplifiers, wherein only the first of said laminar proportional amplifiers is provided with a control port maintained at approximately ambient pressure, and the output ports of said first laminar proportional amplifier vent into the input ports of subsequent laminar proportional amplifiers.

13. The invention of either of claims 11 or 12 wherein said housing and membranes are comprised of neoprene rubber.

14. A sensor for detecting acoustic signals in a liquid environment at variable depths, said sensor comprising:
    a fluidic gainblock having at least one laminar proportional amplifier, wherein each laminar proportional amplifier comprises:
    (a) a substantially non-corrodible housing;
    (b) a liquid-filled cavity disposed within said housing and having forward and aft ends;
    (c) means to produce a liquid jet in said cavity which travels from said forward end to said aft end;
    (e) two output ports extending from the aft end of said cavity in such a way as to collect equal portions of said jet in the absence of an acoustic signal;
    (f) one or more pairs of venting ports which extend from said cavity to a reservoir and are disposed forward of said output ports and on opposite sides of said jet;
    (g) an input port which extends from said cavity and is disposed forward of said venting ports and on one side of said jet, wherein said input port is exposed to said acoustic signal;
    (h) a control port which extends from said cavity and is disposed opposite said input port on the other side of said jet;
    (i) means to sense the hydrostatic pressure of the liquid environment;
    (j) means to maintain the control port at or near the same hydrostatic pressure as the liquid environment;
    whereby an acoustic signal travelling in said liquid environment is made to pass through said input port, causing a change in pressure on one side of said jet, thereby inducing the jet to deflect, and a greater portion of the jet to be collected by one of the two output ports, which affects the pressure therein in a manner proportional to the acoustic signal detected;
    one or more transducers in communication with said output ports to convert pressure variations therein into electrical signals.

15. The invention of claim 14 wherein said cavity and ports are sealed-off from said liquid environment to form a closed system, and said input port terminates in an acoustically transparent membrane, said membrane being exposed on one side to the liquid environment.

16. The invention of claim 15 wherein said membrane is comprised of neoprene rubber.

17. The invention of claims 14, 15 or 16 wherein said housing is comprised of neoprene rubber.

18. The invention of claims 14, 15 or 16 further comprising a plurality of cascading laminar proportional amplifiers, wherein only the first of said laminar proportional amplifiers is provided with a control port maintained at approximately ambient pressure, and the output ports of said first laminar proportional amplifier feed into the input ports of subsequent laminar proportional amplifiers.

19. The invention of claim 17 further comprising a plurality of cascading laminar proportional amplifiers, wherein only the first of said laminar proportional amplifiers is provided with a control port maintained at approximately ambient pressure, and the output ports of said first laminar proportional amplifier feed into the input ports of subsequent laminar proportional amplifiers.

* * * * *